United States Patent
Pinette et al.

(10) Patent No.: US 11,393,015 B1
(45) Date of Patent: Jul. 19, 2022

(54) INTERFACE FOR ITEM ACQUISITION

(71) Applicant: Amazon Technologies, Inc., Seattle, WA (US)

(72) Inventors: Philip Pinette, Seattle, WA (US); Martin Cortez, Seattle, WA (US); Henry Vogler, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 358 days.

(21) Appl. No.: 15/660,861

(22) Filed: Jul. 26, 2017

(51) Int. Cl.
*G06Q 30/06* (2012.01)
*G01J 3/02* (2006.01)
*G06F 3/02* (2006.01)
*G06Q 30/00* (2012.01)
*H04W 4/02* (2018.01)
*G06N 20/00* (2019.01)

(52) U.S. Cl.
CPC ........... *G06Q 30/0641* (2013.01); *G01J 3/02* (2013.01); *G06F 3/02* (2013.01); *G06N 20/00* (2019.01); *G06Q 30/0639* (2013.01); *H04W 4/02* (2013.01); *G06Q 30/00* (2013.01)

(58) Field of Classification Search
CPC .... G06Q 10/06; G06Q 10/08; G06Q 30/0635; G06Q 30/0639; G06Q 50/28; G06Q 10/04; G06Q 10/063112; G06Q 10/063114; G06Q 10/063116; G06Q 10/06316; G06Q 10/0633; G06Q 10/0833; G06Q 10/08355
See application file for complete search history.

(56) References Cited

U.S. PATENT DOCUMENTS

| | | | | |
|---|---|---|---|---|
| 9,406,038 | B2* | 8/2016 | Cantor | G06Q 10/063114 |
| 9,665,899 | B1* | 5/2017 | Nair | G06Q 30/0635 |
| 10,088,331 | B1* | 10/2018 | Yeh | G01C 21/206 |
| 10,089,891 | B2* | 10/2018 | Agrawal | G08G 5/0095 |
| 2005/0278062 | A1* | 12/2005 | Janert | G06Q 50/28 700/214 |
| 2013/0268837 | A1* | 10/2013 | Braithwaite | G06F 9/451 715/234 |
| 2013/0325659 | A1* | 12/2013 | Shekher | G06Q 30/0639 705/26.9 |
| 2013/0325763 | A1* | 12/2013 | Cantor | G06Q 10/06312 706/12 |

(Continued)

*Primary Examiner* — Ariel J Yu
*Assistant Examiner* — Dana Amsdell
(74) *Attorney, Agent, or Firm* — Knobbe Martens Olson & Bear LLP (57) ABSTRACT

Systems and methods are described for providing an item acquisition modeling service. An item acquisition modeling service may determine the expected amount of time required to acquire a set of items from a distribution center. The item acquisition modeling service may estimate travel times and acquisition times for individual items in the set, using a machine learning model that is trained on previous acquisitions of items, and may aggregate individual item estimates to generate a time estimate for the set of items. The item acquisition modeling service may generate and display user interfaces that indicate the elapsed time and remaining time relative to the estimated time, and may indicate whether items are being acquired more quickly or more slowly than the estimate. The item acquisition modeling service may further display target or goal acquisition times, and may indicate whether items are being acquired at a rate that achieves the goal.

22 Claims, 8 Drawing Sheets

(56) References Cited

U.S. PATENT DOCUMENTS

| | | | | |
|---|---|---|---|---|
| 2014/0108663 | A1* | 4/2014 | Peters | G06Q 10/00 |
| | | | | 709/226 |
| 2015/0193094 | A1* | 7/2015 | Armitage | G06F 3/04855 |
| | | | | 715/825 |
| 2017/0011638 | A1* | 1/2017 | Agrawal | G06Q 10/063 |
| 2017/0124671 | A1* | 5/2017 | Tam | G06Q 50/14 |
| 2017/0287057 | A1* | 10/2017 | Nair | G06Q 30/0635 |
| 2018/0024543 | A1* | 1/2018 | Kitamura | G06Q 50/04 |
| | | | | 700/44 |
| 2019/0039606 | A1* | 2/2019 | Fujita | B62D 15/027 |
| 2020/0078103 | A1* | 3/2020 | Duindam | A61B 34/20 |

* cited by examiner

INTERFACE FOR ITEM ACQUISITION

BACKGROUND

Generally described, computing devices and communication networks can be utilized to exchange information. In a common application, a computing device can request information from another computing device or devices via communication network. For example, a user of a personal computing device can utilize a software application process, typically referred to as an "app" or a "browser," to request information via the Internet regarding physical goods that are offered by third parties and made available through a networked computing service. In such embodiments, the personal computing device can be referred to as a client computing device or a mobile computing device.

An operator of a networked computing service may therefore receive requests to acquire physical goods (collectively and individually referred to as "items") that are physically housed at third-party distribution centers, such as stores or warehouses.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure are directed to systems, methods, and computer-readable media related to generating and displaying user interfaces to enable acquisitions of one or more items within an estimated time period. Illustratively, an operator may provide a networked computing service that enables users of personal computing devices (referred to herein as "orderers") to order items that are physically housed at a third-party distribution center, such as a store, warehouse, factory, transportation hub, or other location. The operator of the networked computing service may further communicate with third-party or fourth-party agents (referred to herein as "acquirers") to physically acquire and deliver the ordered items. The operator of the networked computing service may communicate with acquirers, for example, by exchanging information between the networked computing service and acquirer computing devices.

In an illustrative embodiment, a networked computing service may enable users of personal computing devices to order groceries for home delivery. The networked computing service may communicate a user's shopping list via a network to a mobile computing device associated with an acquirer. The acquirer may then physically shop for and acquire the ordered items on behalf of the user who placed the order. The operator of the networked computing service may, in some aspects, guarantee delivery of groceries within a specified time interval. Accordingly, the operator may seek to minimize the amount of time spent acquiring the groceries, in order to allow more time for the act of delivering them.

To address this issue, the operator of the networked computing service may provide user interfaces that enable acquirers to quickly determine information such as the estimated time to acquire a set of items, the estimated times for acquiring individual items, the time remaining for acquiring the set of items, and so forth. An acquirer user interface generation service may, in some embodiments, determine time estimates for acquiring sets of items and present user interfaces that facilitate acquisition of the items within the estimated time interval. The acquirer user interface generation service may use machine learning models trained on previously acquired items to generate time estimates, and may present user interfaces as described below that indicate whether an acquirer is acquiring items at a rate that will meet the time estimate.

It will be understood that the acquirer user interface generation service described herein improves the performance of a computer at the task of enabling users to efficiently acquire items from a collection of items that may number in the thousands. By implementing the acquirer user interface generation service, the computer may identify and present relevant information more quickly and efficiently, thereby reducing the amount of computing resources (e.g., memory, processing power, bandwidth, etc.) required to perform this task. It will further be understood that the acquirer user interface generation service described herein addresses a technical problem that specifically arises in the realm of computer networks, and describes a set of rules that enable a computer to perform a task that could previously only be performed by humans making subjective determinations. For example, no pre-Internet practice existed by which an acquirer of items on a grocery store shopping list would have continuing access to a user interface that presented timeframes for acquiring individual items, and that indicated whether the acquirer was on pace to acquire a set of items within an overall time estimate. Such interfaces are only possible in the realm of computer networks, and as such the technical solutions described herein are inherently tied to computing technologies.

Although examples are provided herein with regard to user interfaces that enable acquisition of items from a grocery store, it will be understood that the present disclosure is not limited to any particular type of item or distribution center. For example, aspects of the present disclosure may include providing user interfaces for acquisition of parts from a warehouse, goods from a department store, food from a cafeteria, and the like. As further examples, aspects of the present disclosure may include providing user interfaces for acquisition of goods or services associated with various locations, such as running errands, walking pets, taking a vehicle in for service, etc. The examples are thus understood to be illustrative and not limiting.

As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system. Additionally, as used herein, the term "pickup time" refers to the time required to perform the physical act of taking possession of an item (e.g., taking the item from its shelf and placing it in a shopping cart), the term "travel time" refers to the time required to travel from one location to another (e.g., between two items), and the term "acquisition time" refers to the aggregate time (e.g., the pickup time and the travel time) associated with a particular item or set of items.

The foregoing aspects and many of the attendant advantages will become more readily appreciated as the same become better understood by reference to the following detailed description, when taken in conjunction with the accompanying drawings.

Figure 1A:
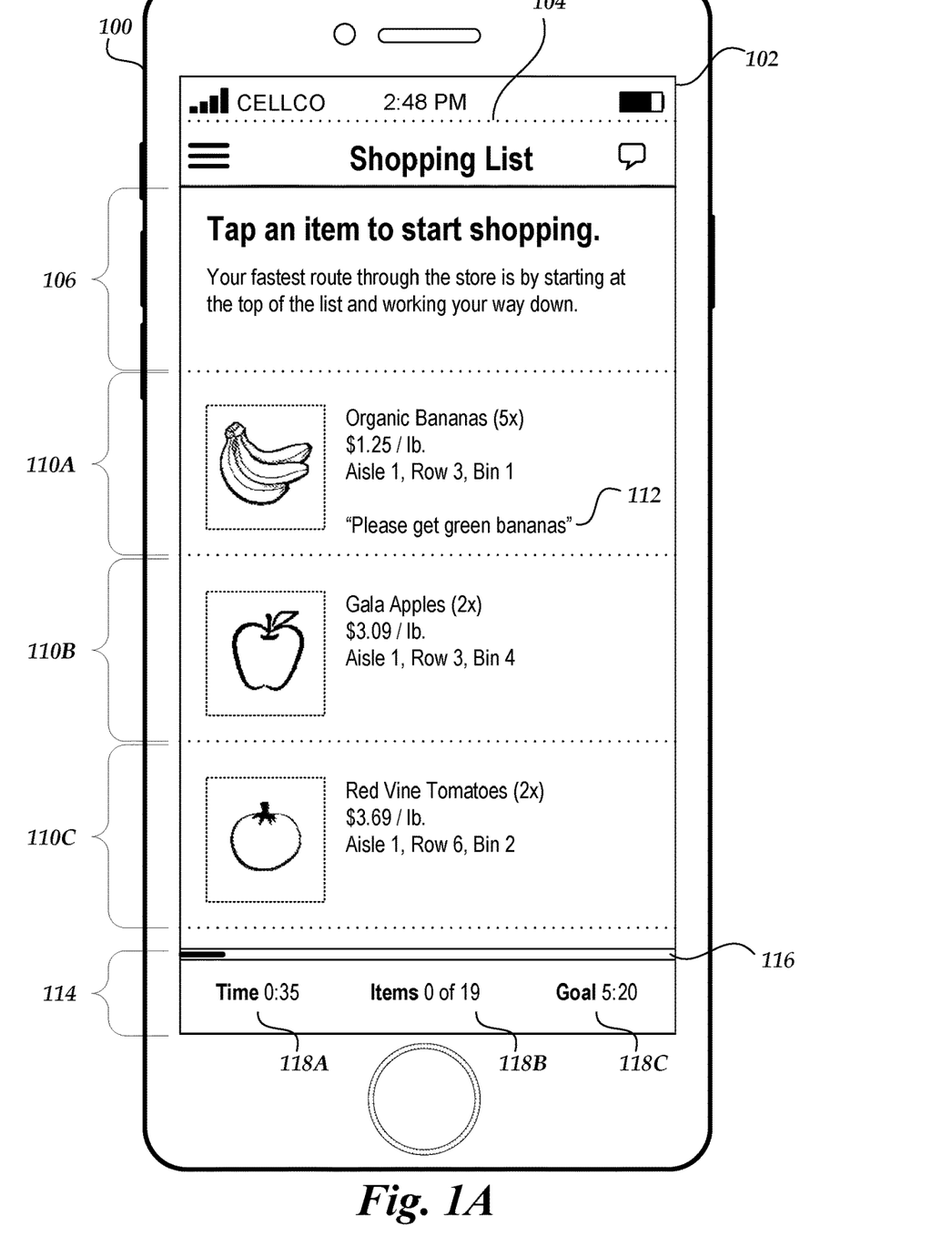
FIGS. 1A-1D are pictorial diagrams depicting illustrative item acquisition user interfaces in accordance with aspects of the present disclosure.

FIG. 1A is a pictorial diagram of an illustrative acquirer computing device 100, which displays an illustrative user interface 102 for acquiring items in accordance with aspects of the present disclosure. The user interface 102 may be displayed, for example, on a touchscreen or other display element of the acquirer computing device 100. The illustrative user interface 102 may include an item list 104, which in turn may include an informational message 106. Illustratively, the user of the user interface 102 may be a person responsible for acquiring items displayed by the user interface 102, such as items 110A-C. The user of the user interface 102 may thus be referred to as an "acquirer," as described above. The item list 104 and the informational message 106 may therefore indicate that the acquirer should acquire the listed items.

Figure 1B:
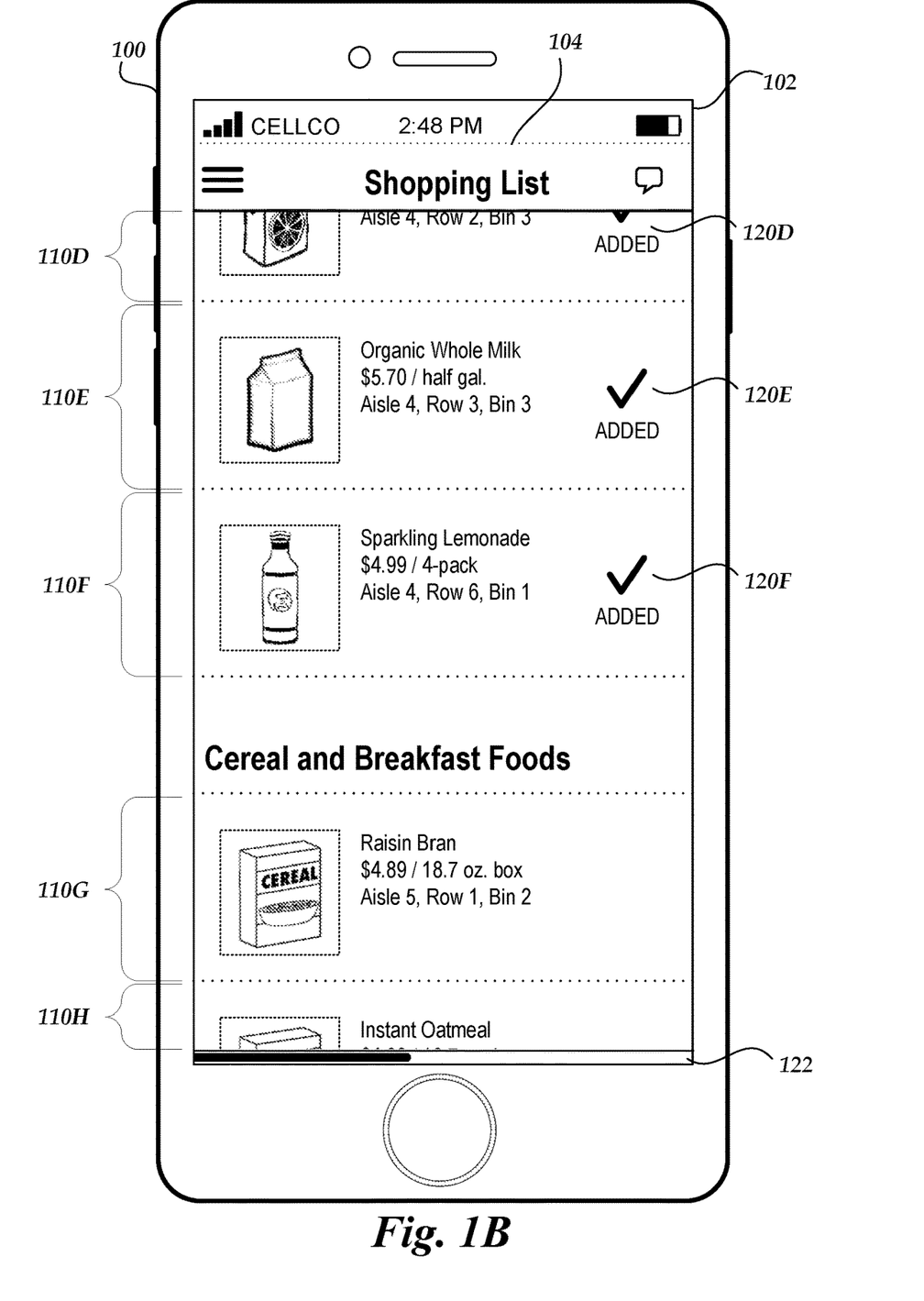
Figure 1C:
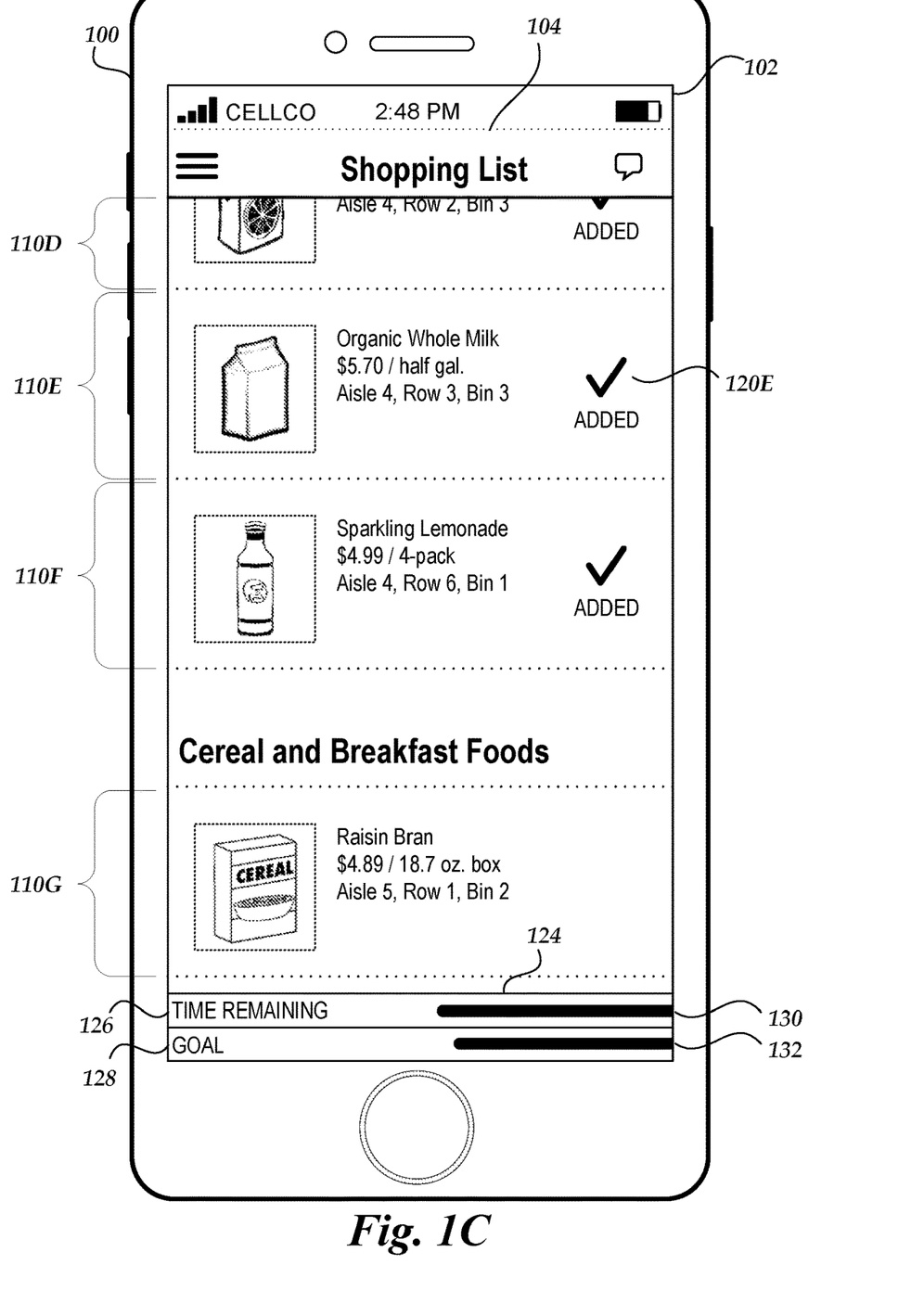
Figure 1D:
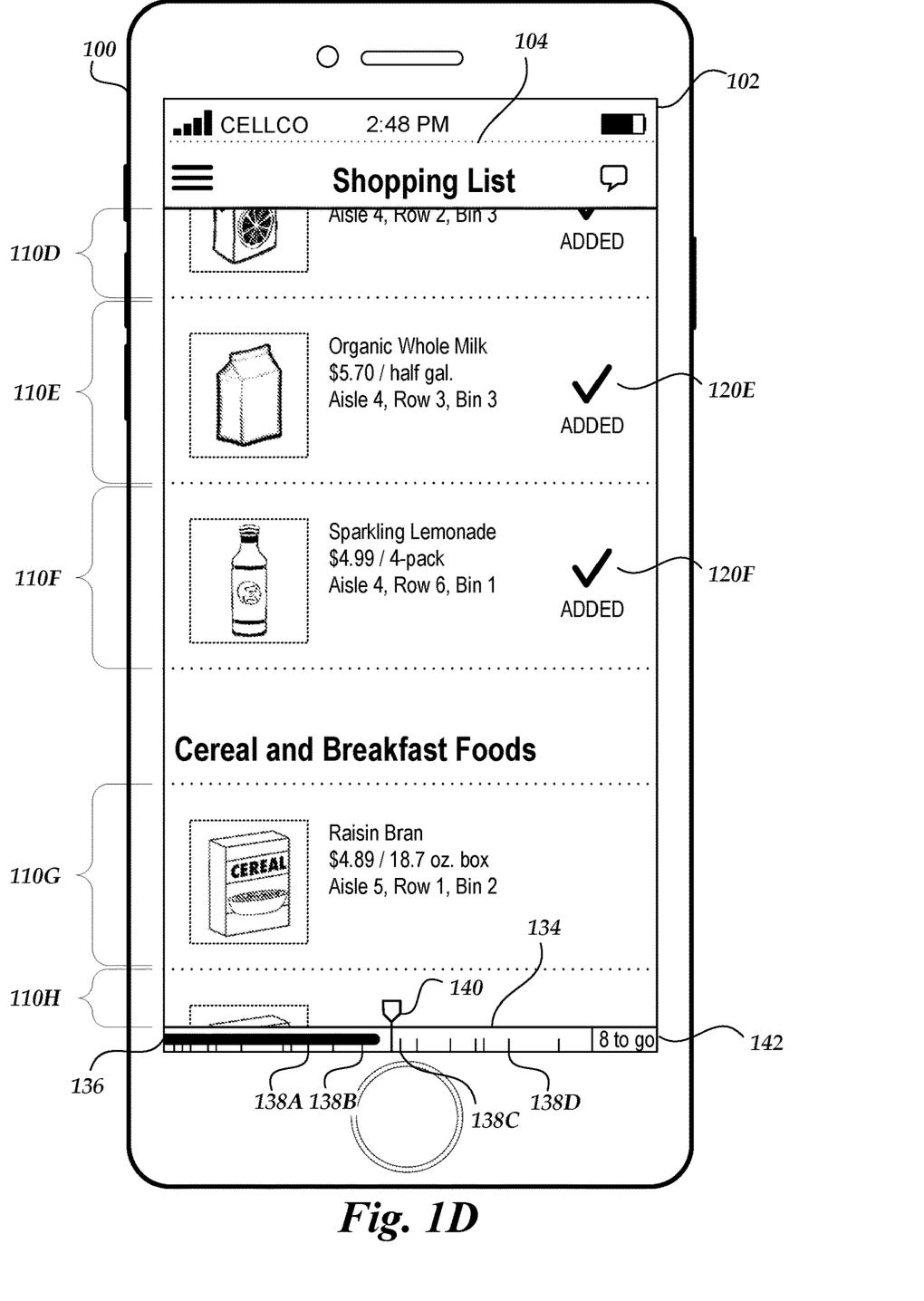

The item list 104 may further include a list of items to acquire, of which the first three items 110A-C are displayed in the user interface 102. It will be understood that the present disclosure is not limited to any particular number of items. In some embodiments, as depicted in FIGS. 1B-1D, the list of items may be scrollable, and further items may be displayed as the acquirer scrolls through the list. In other embodiments, items 110A-C may be removed from the list, or displayed in a separate list, as the user acquires these items. Individual items, such as item 110A, may further include item-specific instructions 112 that instruct the acquirer regarding the individual item to be acquired. Items 110A-C may further include information that enables the acquirer to identify and locate the item, such as a picture of the item, brand name, price, size, or information regarding the item's location within the distribution center.

In some embodiments, as described in more detail below, the item list 104 may be an ordered list, such that acquiring the items in the specified order will reduce the amount of travel time between items. For example, items that belong to a particular category (e.g., "produce" or "dairy products") may be grouped together on the ordered list, or items may be grouped or sorted according to their location within the distribution center, such that items that are found in "Aisle 1" are sorted to the top of the list, followed by items found in "Aisle 2," and so forth. In further embodiments, the ordering of the ordered list may be determined by an acquirer user interface generation service.

The user interface 102 may include an item acquisition status panel 114. The item acquisition status panel 114 includes a fuse bar 116 as well as an elapsed time indicator 118A, an items acquired indicator 118B, and an estimated time indicator 118C. It will be understood that the indicators 118A-C are provided for purposes of example, and that other user interface elements may be displayed on the item acquisition status panel 114. For example, as described below, the item acquisition status panel 114 may include multiple or overlapping fuse bars 116, which may indicate performance goals or targets with regard to acquiring the items. The item acquisition status panel 114 may further include informational messages or other status indicators regarding the acquisition of items.

In various embodiments, as described in more detail below, the fuse bar 116 may increase or decrease in size as the elapsed time approaches the estimated time for acquiring all items, or as the number of items acquired thus far approaches the total. For example, the fuse bar 116 may display a fuse that is consumed from right to left as time elapses, a progress bar that grows from left to right as items are acquired, or other such variations.

In some embodiments, touch interactions with the fuse bar 116 may be enabled such that the acquirer can drag the fuse bar up or down to reveal or hide the indicators 118A-C. In other embodiments, the indicators 118A-C may be automatically revealed if certain criteria are met. For example, the indicators 118A-C may be revealed if the elapsed time is within a specified amount or percentage of the estimated time, or if a determination is made that the number of items remaining are unlikely to be acquired within the time remaining. In further embodiments, as described below, the indicators 118A-C may be shown or hidden automatically as the acquirer scrolls the list of items to acquire. For example, the indicators 118A-C may be displayed initially, hidden as the acquirer scrolls down in the list of items, and may be redisplayed when the acquirer scrolls back to the top of the list.

FIG. 1B is a pictorial diagram of the acquirer computing device 100 displaying the illustrative item acquisition user interface 102 at a later time. In FIG. 1B, the acquirer has scrolled the list of items such that items 110D-H are fully or partially displayed. The user interface 102 further indicates that the acquirer has acquired items 110D-F, as indicated by the item acquisition indicators 120D-F. In some embodiments, as described above, items that have been acquired may be removed from the list or displayed in a separate list rather than being displayed with an item acquisition indicator.

As illustrated in FIG. 1B, the user interface 102 displays a fuse bar 122, which as described above may be selectable or draggable to enable display of the item acquisition status panel 114 or other information. In various embodiments, the fuse bar 122 may use size, color, animation, or other indications to display information regarding the elapsed time. For example, the fuse bar 122 may be displayed in green if the acquirer is acquiring items more quickly than the estimated time for acquiring them, may be displayed in yellow if the items are being acquired at or near the estimated time, and may be displayed in red if the items are being acquired more slowly than the estimated time. As a further example, the fuse bar 122 may "pulse" or change size as the elapsed time approaches the estimated time.

In some embodiments, the fuse bar 122 may only be displayed in accordance with certain criteria. For example, the fuse bar 122 may be displayed only if items are being acquired too slowly for the estimated time to be achieved, and may be omitted if items are being acquired at a rate in accordance with (or faster than) the estimated time. In further embodiments, a fuse bar 122 may be displayed that corresponds to an individual item, such as item 110F. The item-specific fuse bar 122 may display information regarding item 110F's contribution to the elapsed time and overall estimated time, including the estimated travel time for traveling from the location of item 110E to the location of item 110F, and the estimated item pickup time for taking possession of item 110F. Still further, in some embodiments, individual fuse bars 122 may be displayed in association with each or a subset of the items in the list 104.

In some embodiments, the fuse bar 122 may be responsive to touch gestures. For example, the fuse bar 122 may be responsive to a pinch gesture, allowing the user to "zoom in" from an overall display to an item-specific display (or "zoom out" from an item display to an overall display). As a further example, the fuse bar 122 may be responsive to a tap-and-drag gesture, such that the user can detach the fuse bar 122 from the bottom of the screen and dock or attach it to a particular item 110D-H. The fuse bar 122 may display item-specific information while docked, and may automatically undock (and may return to the bottom of the screen) after the item 110D-H is acquired. The fuse bar 122 may provide feedback such as a vibration or tone when docking or undocking. Still further, in some embodiments, the user may drag the fuse bar 122 to enable a "jeweler's loupe" effect, magnifying the fuse bar 122 or an item as it hovers over individual items 110D-H.

It will be understood that the travel times and pickup times for individual items may vary according to a number of factors. For example, the travel times between items that are located near each other, such as items 110G and 110H, may be relatively small. In some embodiments, travel times may be determined based on factors such as the layout of the distribution center, the time of day, the day of the week, and so forth. For example, a grocery store may have more customers than usual on Saturday afternoons or holidays, which may increase the time needed for the acquirer to travel between aisles. The pickup times for individual items may further vary according to factors such as the item location, category, size, weight, quantity, and so forth. For example, a heavy or bulky item may take more time to pick up than a smaller or lighter item. As further examples, some categories of items (e.g., frozen foods or small valuable items) may be located in cases that must be opened, or may require interaction with staff members of the distribution center in order to obtain (e.g., deli meats). Still further, some items on the list 104 may be in similar packaging or otherwise similar in appearance to items that are not on the list 104 (e.g., a particular roast of coffee), and additional time may be needed to verify that the correct item has been picked.

FIG. 1C is a pictorial diagram of the acquirer computing device 100 displaying the illustrative item acquisition user interface 102 with an alternative embodiment of the item acquisition status panel 124. In FIG. 1C, the item list 104, items 110D-G, and item acquisition indicators 120D-F are as described above with reference to FIG. 1B.

In FIG. 1C, the status panel 124 displays an acquirer fuse bar 126 and a goal fuse bar 128. Illustratively, the acquirer fuse bar 126 indicates the time that the acquirer has remaining to complete acquisition of the items in the item list 104 within the estimated time. The goal fuse bar 128 may indicate a rate or pace of item acquisition that will complete the acquisitions within the estimated time, and may thereby enable visual comparison of the acquirer's progress relative to the rate at which progress needs to be made. In the illustrated embodiment, the acquirer has more time remaining than is estimated to be needed (that is, the acquirer's "time remaining" bar 130 is larger than the "goal" bar 132). The acquirer is thus likely to acquire the set of items within the estimated time.

In various embodiments, the goal fuse bar 128 may indicate a target performance goal for acquiring the items, a previous performance of the acquirer (e.g., a "personal best" time) or of another acquirer (e.g., a "store record" time), an average performance, a threshold performance, or other goal for acquiring the items within a time period, which may or may not correspond to the estimated time. In some embodiments, the goal fuse bar 128 may correspond to all or part of an acquirer fuse bar displayed on a second acquirer computing device 100. The second acquirer computing device 100 may further display the acquirer fuse bar 126 as its goal fuse bar, enabling a "head-to-head" timed competition between two acquirers. In further embodiments, a handicap, time delay, or other offset may be determined and displayed to enable comparisons between acquirers who are acquiring different sets of items.

In some embodiments, the acquirer fuse bar 126 and the goal fuse bar 128 may be combined and displayed as a single fuse bar. For example, the acquirer's remaining time may be displayed as a fuse bar, and the goal may be displayed as a moving line drawn on the fuse bar, a color of the fuse bar, or as a fuse bar of a different color or transparency (e.g., a "ghost" fuse bar) that is superimposed on the acquirer's fuse bar 126. In other embodiments, as described above, the goal fuse bar 128 may be displayed only if certain criteria are met, such as the acquirer falling behind the pace indicated by the goal fuse bar 128. The embodiment depicted in FIG. 1C is thus understood to be illustrative and not limiting.

FIG. 1D is a pictorial diagram of the acquirer computing device 100 displaying the illustrative item acquisition user interface 102 with an alternative embodiment of the item acquisition status panel 134. In FIG. 1D, the item list 104, items 110D-H, and item acquisition indicators 120D-F are as described above with reference to FIG. 1B.

The item acquisition status panel 134 includes a fuse bar 136, which increases in size from left to right as time elapses. The fuse bar 136 includes a number of tick marks, such as tick marks 138A-D. Illustratively, the tick marks may indicate the estimated acquisition times associated with individual items on the item list 104. For example, tick mark 138C may correspond to item 110G. The distance between tick marks 138B and 138C on the fuse bar 136 may thus indicate the travel time required to travel from the location of item 110F to the location of item 110G plus the pickup time required to acquire item 110G. Tick mark 138A may illustratively correspond to one of the items that has already been acquired, and tick mark 138D may correspond to an item that has yet to be acquired. It will be understood that, for clarity of illustration, only a subset of the tick marks depicted in FIG. 1D have been labeled with reference numbers.

The fuse bar 136 may further display a goal time indicator 140, which may move from left to right as time elapses, and which may indicate the pace at which items must be acquired in order to complete acquiring the items within the estimated time. In the illustrated embodiment, the acquirer's elapsed time, as indicated by the fuse bar 136, is not keeping up with the goal time indicator 140, and the display thus indicates that the acquirer must acquire the remaining items more quickly in order to achieve the goal. In some embodiments, the item acquisition status panel 134 includes a remaining item quantity indicator 142, which indicates the number of items on the list 104 that have yet to be acquired.

In some embodiments, the item acquisition user interface 102 may provide audio or haptic feedback in addition to, or in lieu of, visual feedback as time elapses. For example, the user interface 102 may cause the acquirer computing device 100 to vibrate as the fuse bar 136 crosses each of the tick marks 138A-D, may provide audio feedback when a certain amount of time has elapsed or is remaining, or may cause user interface elements (e.g., the fuse bar 136) to change color or size when various criteria are met. In further embodiments, the type of feedback to provide may be determined based on goal-related or other criteria. For example, the user interface 102 may vary the volume of a "ticking clock" sound based on whether the acquirer is ahead or behind relative to the goal time.

It will be understood that FIGS. 1A-1D are provided for purposes of example, and that various interfaces containing more, fewer, or different elements are within the scope of the present disclosure. For example, any or all of the indicators 118A-C may be omitted, combined, separated, reordered, or repositioned relative to each other. As a further example, on the informational message 106 may be omitted. Still further, a virtual keyboard or other input mechanism may be displayed below the item acquisition status panel 114, 124, or 134, and the status panel may be displaced upward as the virtual keyboard appears below it. FIGS. 1A-1D are thus understood to be illustrative and not limiting.

Figure 2:
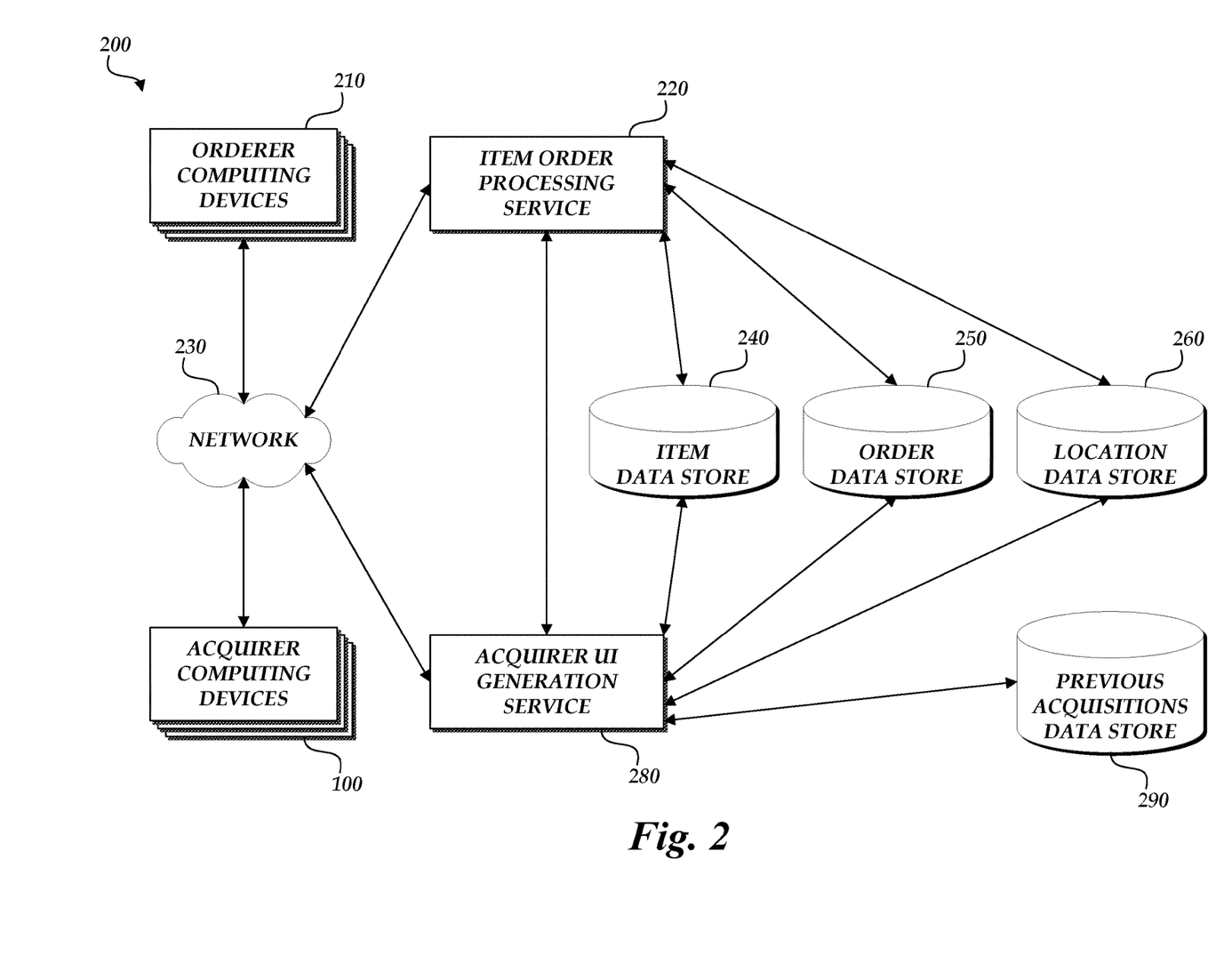
FIG. 2 is a functional block diagram depicting an illustrative network environment for implementing an acquirer user interface generation service in accordance with aspects of the present disclosure.

FIG. 2 is a functional block diagram depicting an illustrative network environment 200 for implementing an item acquisition modeling service in accordance with aspects of the present disclosure. In the illustrated network environment 200, orderer computing devices 210 communicate with an item order processing service 220 via a network 230.

Orderer computing devices 210 may illustratively be any computing devices that implement aspects of the present disclosure, including but not limited to generating requests to acquire sets of items. The orderer computing devices 210 can include, for example, computing devices such as desktop computers, server computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor. The requests generated by the order computing devices 210 may in turn be processed by the item order processing service 220. The item order processing service 220 may interact with an item data store 240, an order data store 250, and a location data store 260 to implement aspects of the present disclosure. The item order processing service 220 may interact with data stores 240-260 via direct connections, network 230, or another network. In some embodiments, the orderer computing device 210 and the item order processing service 220 may be combined and implemented as a single device.

The network 230 may be any wired or wireless network, or combination thereof. In addition, the network 230 may include, but is not limited to, a personal area network, a local area network (LAN), wide area network (WAN), cable network, satellite network, mesh network, cellular telecommunications network, the Internet, any other public or private communications network or networks, or any combination thereof. In some embodiments, the network 230 may be a private or semi-private network, such as a corporate or university intranet. The network 230 may include one or more wireless networks, such as a Global System for Mobile Communications (GSM) network, a Code Division Multiple Access (CDMA) network, a Long Term Evolution (LTE) network, or some other type of wireless network. The network 230 may use protocols and components for communicating via the Internet or any of the other aforementioned types of networks. In some embodiments, the network 230 may be omitted, and one or more of the orderer computing devices 210, item order processing service 220, acquirer computing devices 270, or acquirer user interface generation service 280 may communicate directly with each other.

The item data store 240 may illustratively store data regarding items available for acquisition. For example, the item data store 240 may store data regarding item sizes, categories, prices, images, descriptions, or other data relating to individual items. The order data store 250 may illustratively store data regarding orders placed by the orderer computing devices 210. For example, the order data store 250 may store data regarding a set of items associated with a particular order, a delivery location, delivery time window, and the like. The location data store 260 may illustratively store data regarding the locations of items within distribution centers. For example, the location data store 260 may store data regarding an aisle number, row number, shelf, department, or other information that enables an acquirer of items to locate an item within a distribution center.

The illustrated network environment 200 further includes acquirer computing devices 100, which communicate with an acquirer user interface generation service 280 via the network 230 (or via another network). The acquirer computing devices 100 may illustratively be any computing devices that implement aspects of the present disclosure, including but not limited to displaying, and enabling interaction with, the user interfaces described above with reference to FIGS. 1A-1D. The acquirer user interface generation service 280 is described in more detail below with reference to FIG. 5.

The acquirer user interface generation service 280 may communicate (directly, via the network 230, or via another network) with the item data store 240, the order data store 250, and the location data store 260, and may further communicate with a previous acquisitions data store 290. The previous acquisitions data store 290 may illustratively store data regarding previous item acquisitions. For example, the previous acquisitions data store 290 may store the times actually taken to acquire items in a particular distribution center, estimated travel times between items, estimated pickup times for items, acquisition times for particular acquirers or distribution centers, and the like.

The data stores 240, 250, 260, and 290 may illustratively be any non-transient computer-readable media, including but not limited to hard drives, solid state devices, flash memories, EEPROMs, or other storage media accessible to or by a device such as an access device, server, or other computing device. In various embodiments, the data stores 240, 250, 260, and 290 may be implemented as a database, a database server, a component of another server or service (e.g., the item order processing service 220), or may be implemented as more or fewer data stores than are depicted in the example embodiment. For example, the item data store 240 and the location data store 260 may be combined into a single data store, or the order data store 250 and the previous acquisitions data store 290 may be combined. A data store may also or alternatively be distributed or partitioned across multiple local and/or remote storage devices as is known in the art without departing from the scope of the present disclosure. In yet other embodiments, a data store may include or be embodied in a data storage web service.

In various embodiments, some or all of the item order processing service 220, the acquirer user interface generation service 280, or the data stores 240, 250, 260, or 290 may be components of a networked computing service provided by an operator, as described above. In other embodiments, the acquirer user interface generation service 280 or other components described in FIG. 2 may be implemented separately or independently from a networked computing service.

It will be understood that many of the components described in FIG. 2 are optional, and that embodiments of the present disclosure may combine or reorganize the components. Furthermore, the components need not be distinct or discrete. For example, one or more of the data stores 240, 250, 260, or 290 may be implemented as a component of the acquirer user interface generation service 280, or the item order processing service 220 and the acquirer user interface generation service 280 may be represented in a single physical device, or, alternately, may be split into multiple physical devices.

In some embodiments, the item order processing service 220, the acquirer UI generation service 280, or both may be omitted, and the acquirer computing devices 100 may operate in a distributed or peer-to-peer mode that implements some or all of the functions of the item order processing service 220 and the acquirer UI generation service 280. For example, individual acquirer computing devices 100 may each maintain a separate list of items to acquire. A first acquirer computing device 100 may then transmit its current location to the other acquirer computing devices 100, which may respond by identifying and transmitting information enabling acquisition of nearby items from their respective lists. In further embodiments, individual acquirer computing devices 100 may then generate fuse bars or other user interface elements based on the information received from their peers. The acquirer computing devices 100 may thus collaborate with each other to ensure that all of the items on all of the lists are obtained, and to generate fuse bars and other UI elements corresponding to the items obtained by an individual acquirer.

Figure 3:
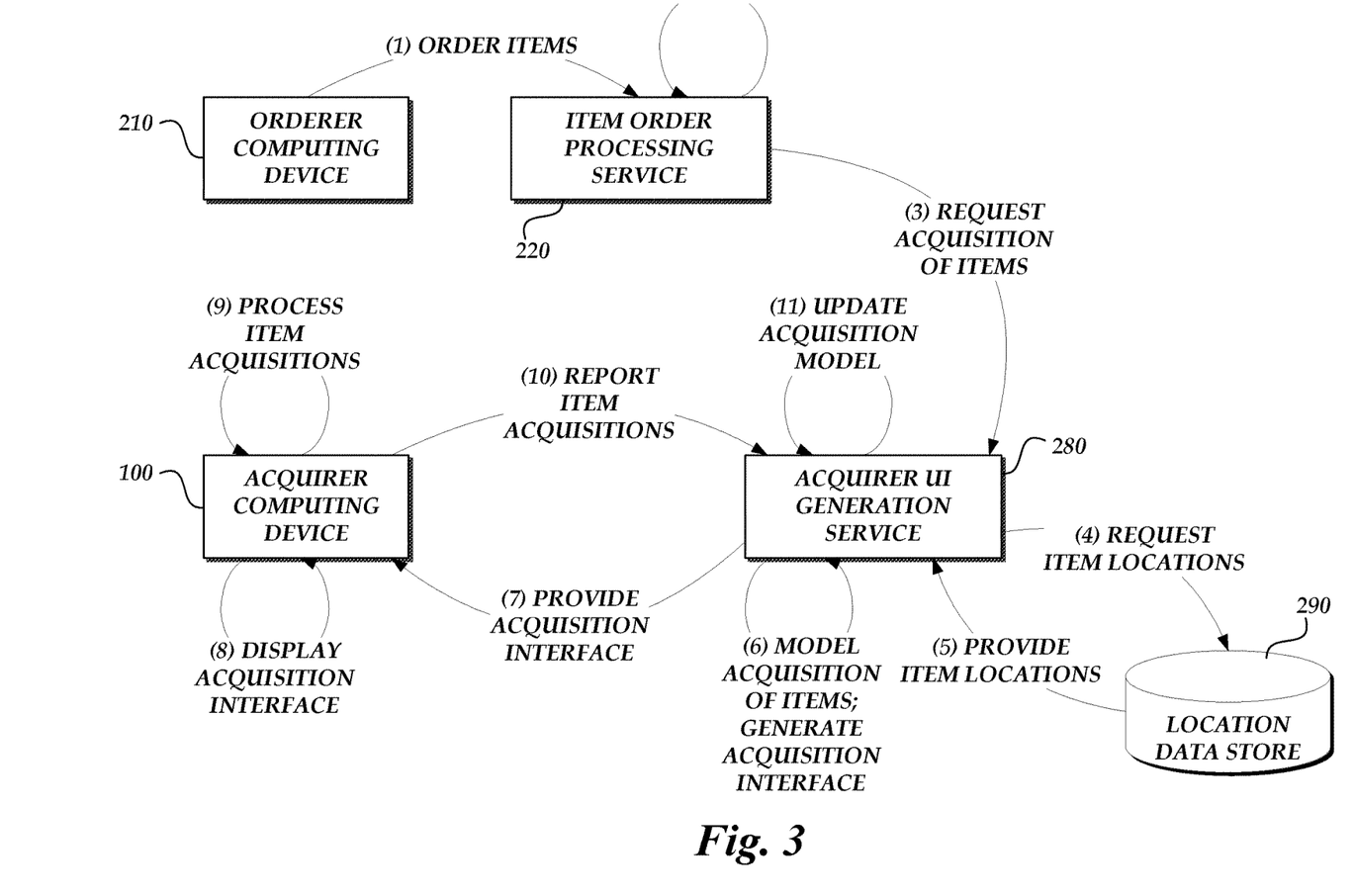
FIG. 3 is a block diagram depicting generation of item acquisition user interfaces in accordance with aspects of the present disclosure.

FIG. 3 is a block diagram depicting generation of item acquisition user interfaces in accordance with aspects of the present disclosure. At (1), an orderer computing device 210 may generate and transmit a request for a set of items. Illustratively, the orderer computing device 210 may be associated with a consumer of the set of items, and may implement an application that enables the consumer to purchase the set of items for delivery. At (2), the item order processing service 220 may process the order. Illustratively, processing the order may include determining a time at which to begin acquiring the items in the order (e.g., for an order that specifies a future delivery time), identifying items that may be substituted if particular items in the order are unavailable, verifying that the order meets various criteria such as a minimum order threshold, or other order processing.

In some embodiments, the interactions at (1) and (2) may be omitted, and the acquirer user interface generation service 280 may obtain sets of items to acquire that originate from sources other than orderer computing devices 210. For example, a service that automatically generates periodic or recurring requests to acquire items may transmit sets of items to the acquirer user interface generation service 280.

At (3), the acquirer user interface generation service 280 may receive a set of items to acquire. Illustratively, the set of items may be a grocery list or other shopping list generated by an orderer computing device 210 and processed by the item order processing service 220, as described above. In some embodiments, the request to acquire a set of items may identify a particular distribution center from which the items are to be acquired. In other embodiments, the acquirer user interface generation service 280 may identify a distribution center based on the availability of the items at various distribution centers.

At (4), the acquirer user interface generation service 280 requests information regarding the locations of the items within a particular distribution center. As described above, the location information may include information that enables an acquirer of items to locate the items. For example, the location information may indicate that a particular item can be found in row K, shelf 2, bin 7 of a parts warehouse, or that a particular item can be found in aisle 4, section 2, bottom shelf of a grocery store. As a further example, the location information may indicate that a first errand is to be run at a first street address, a second errand is to be run at a second street address, and so forth. At (5), the requested item locations may be provided to the acquirer user interface generation service 280.

At (6), the acquirer user interface generation service 280 may model the acquisition of items. As described in more detail below, modeling the acquisition of items may include determining an order in which the items will be acquired, estimating a travel time from one item to the next, and estimating pickup times for the individual items. In some embodiments, a machine learning model that has been trained on previous item acquisitions may be applied in order to estimate travel times and pickup times. Additionally, in some embodiments, the order in which to acquire the items may be determined based on characteristics of the items. For example, items that are located in the same section of the distribution center (e.g., the produce section of a grocery store) may be grouped together in the ordered list of items.

In some embodiments, location information for one or more items may not be available. In such embodiments, the acquirer user interface generation service 280 may estimate travel time to items with unknown locations based on historical travel times between items with known locations and an item with an unknown location. For example, the items to acquire may include items A, B, C, and X, with item X having an unknown location. The acquirer user interface generation service 280 may obtain historical travel times indicating that the travel time between item A and item X is 30 seconds, the travel time between item B and item X is 10 seconds, and the travel time between item C and item X is one minute. The acquirer user interface generation service 280 may therefore determine that item X should be acquired just before or just after item B to reduce the travel times between items.

The acquirer user interface generation service 280 may further generate an acquisition user interface for presentation to an acquirer, based on the modeled acquisition of items. In some embodiments, the acquirer user interface generation service 280 may identify an acquirer who will acquire the items. Illustratively, the acquirer user interface generation service 280 may receive information indicating that a particular acquirer is at the distribution center from which the items will be acquired, and may thus identify the acquirer and associate them with the set of items to be acquired. In other embodiments, the acquirer may be obtained from the request at (3) or received from an acquirer computing device 100.

At (7), the acquirer user interface generation service 280 may provide the acquisition user interface to an acquirer computing device 100 associated with the acquirer. In some embodiments, the acquirer user interface generation service 280 may generate a full user interface, such as the user interface 102 of FIGS. 1A-1D. In other embodiments, the acquirer user interface generation service 280 may generate a particular user interface element, such as the item acquisition status panel 114, 124, or 134 of FIGS. 1A-1D. In still further embodiments, the acquirer user interface generation service 280 may generate a set of information (e.g., estimated times associated with individual items in the set) that enables the acquirer computing device 100 to generate the acquisition user interface.

At (8), the acquirer computing device 270 may display an item acquisition user interface, as described above, and at (9) may process acquisitions of items by the acquirer. At (10), in some embodiments, the acquirer computing device 100 may report information regarding item acquisitions to the acquirer user interface generation service 280. For example, the acquirer computing device 100 may report the amount of time elapsed between individual item acquisitions. At (11), in further embodiments, the acquirer user interface generation service 280 may update its machine learning model based on the information received regarding item acquisitions. For example, the acquirer user interface generation service 280 may use the received information to retrain the machine learning model.

In some embodiments, the acquirer user interface generation service 280 may collect, store and provide information regarding individual acquirers. For example, the acquirer user interface generation service 280 may collect and store information regarding previous acquisitions by a particular acquirer, and use a machine learning model trained on these previous acquisitions to generate a time estimate for the particular acquirer to acquire the items. In other embodiments, the acquirer user interface generation service 280 may analyze and compare the time elapsed between individual item acquisitions to identify the respective travel times and pickup times for particular items. For example, the acquirer user interface generation service 280 may compare the time elapsed between the acquisitions of item A and item B, the time elapsed between the acquisitions of item A and item C (which is located adjacent to item B), and the time elapsed between the acquisitions of other items and items B or C to isolate the portion of the elapsed time to attribute to travel between items and the portion of the elapsed time to attribute to taking possession of the item.

In some embodiments, the acquirer UI generation service 280 may determine that an acquirer deviated from the modeled order of item acquisitions, and may use this information to update the acquisition model. For example, the acquirer UI generation service 280 may at (10) receive reports of item acquisitions in a different order than the order determined at (6). The acquirer UI generation service 280 may assess whether the acquirer has found a more efficient order, and if so may update or retrain the acquisition model accordingly.

It will be understood that FIG. 3 is provided for purposes of example, and that the interactions depicted may be varied within the scope of the present disclosure. For example, the acquirer computing device 100 may request a set of items to acquire rather than the acquirer user interface generation service 280 identifying the acquirer. As a further example, the interactions at (10) and (11) may be omitted, or the interaction at (11) may be performed on a periodic or as-needed basis. FIG. 3 is thus understood to be illustrative and not limiting.

Figure 4:
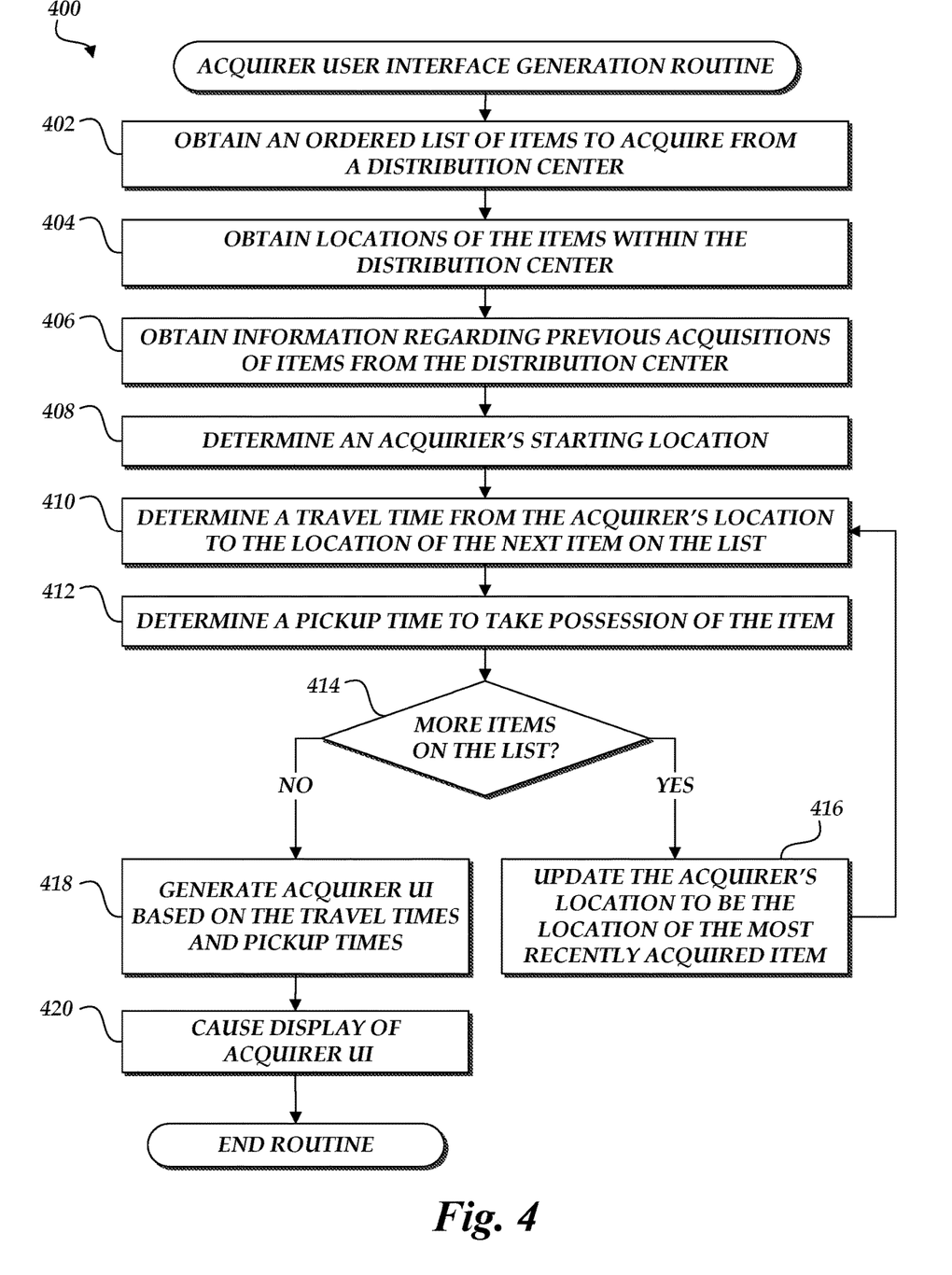
FIG. 4 is a flow diagram depicting an illustrative acquirer user interface generation routine that may be implemented by an acquirer user interface generation service in accordance with aspects of the present disclosure.

FIG. 4 is a flow diagram depicting an illustrative acquirer user interface generation routine 400. The illustrative routine 400 may be carried out in whole or in part, for example, by the acquirer user interface generation service 280 of FIG. 2, the acquirer computing device 270 of FIG. 2, or another computing device or devices. At block 402, an ordered list of items to acquire may be obtained. Illustratively, the ordered list of items may be obtained as part of a request to acquire the items. In some embodiments, a set of items to acquire may be obtained, and the ordered list may be determined as described above. In further embodiments, a distribution center may be obtained as part of the request, or a distribution center may be determined based on the list of items.

At block 404, information regarding locations of the items within the distribution center may be obtained. As described above, the location information enables an acquirer of items to locate the items within the distribution center.

At block 406, information may be obtained regarding previous acquisitions of items from the distribution center, or in some embodiments information may be obtained regarding previous acquisitions of items from multiple distribution centers. In some embodiments, the obtained information may be specific to a particular distribution center, acquirer, or set of items to be acquired. In further embodiments, a machine learning model may be obtained at block 406 rather than obtaining information regarding previous acquisitions. The machine learning model may be trained on previous acquisitions, as described above.

At block 408, a starting location of an acquirer may be determined. Illustratively, the starting location of an acquirer may be determined based on the distribution center in which the acquirer is located. For example, a distribution center may designate a location for acquirers who are not currently engaged in item acquisition. In some embodiments, a starting location of an acquirer may be determined based on information received from an acquirer computing device, such as geolocation data or self-reported location information.

At block 410, an estimated travel time may be determined for traveling from the acquirer's location to the location of the next item on the ordered list of items to acquire. For example, the acquirer may be located at the entrance to a grocery store, and the first item on the ordered list may be located in the produce section. A travel time may thus be determined between the grocery store entrance and the location of the item in the produce section. In later iterations of block 410, travel times may be determined between the locations of consecutive items on the ordered list (e.g., between the location of the fourth item and the location of the fifth item).

At block 412, an estimated pickup time for the item may be determined. As described above, the pickup time for an item may vary according to the type or category of item, the quantity of items to be acquired, item-specific instructions, or various item characteristics. For example, the item to be acquired may be a gallon of milk, and item-specific instructions may specify that the acquirer should check that the expiry date of the milk is at least a week from today. In some embodiments, the ordering of items in the ordered list may be determined based on item-specific instructions or characteristics, such as perishable items being acquired last in order to reduce the risk of expiry. The acquirer may thus spend more time opening a refrigerator door and checking expiry dates than would otherwise be spent taking possession of an item that is not refrigerated and does not have item-specific instructions. In some embodiments, item-specific instructions may be analyzed and a separate estimated time may be determined for complying with the instruction.

At decision block 414, the determination may be made as to whether travel times and pickup times have been estimated for all of the items on the ordered list of items. If not, then at block 416 the acquirer's location may be updated to the location of the most recently acquired item. The acquirer's route through the distribution center may thus be simulated and modeled. The routine 400 then branches to block 410, and iterates through blocks 410-416 until acquisition of all items has been modeled.

In some embodiments, as described above, a machine learning model may be applied to estimate the travel times and pickup times of the items. For example, a machine learning model may be trained on a data set that includes previous acquisitions by acquirers traveling from various locations in the distribution center to the location of a particular item, and then taking possession of the item. The machine learning model may thus be applied to estimate travel and pickup times for the item.

If the determination at decision block 414 is that travel and pickup times have been estimated for all of the items on the ordered list, then at block 418 a time estimate may be generated based on the travel times and pickup times. In various embodiments, the time estimate may include time estimates for acquiring individual items, an aggregate estimate for acquiring the full set of items, target acquisition times for individual items or the full set of items, or combinations thereof.

At block 420, the acquisition time estimate may be output. Illustratively, in some embodiments, the time estimate may be output by generating and causing display of a user interface element, such as the item acquisition status panel 114 of FIG. 1A, that includes information from the time estimate. In other embodiments, the information may be output and may be used by another device (such as an acquirer computing device 270) to generate and display user interfaces or user interface elements. Thereafter, the routine 400 ends.

In various embodiments, the blocks of the routine 400 may be combined, omitted, or carried out in various orders. For example, block 408 may be carried out prior to block 406, block 404, or prior to execution of the routine 400. As a further example, blocks 402 and 404 may be combined, such that the information obtained is a set of item locations. Still further, blocks 410 and 412 may be carried out in either order. The routine 400 is thus understood to be illustrative and not limiting.

Figure 5:
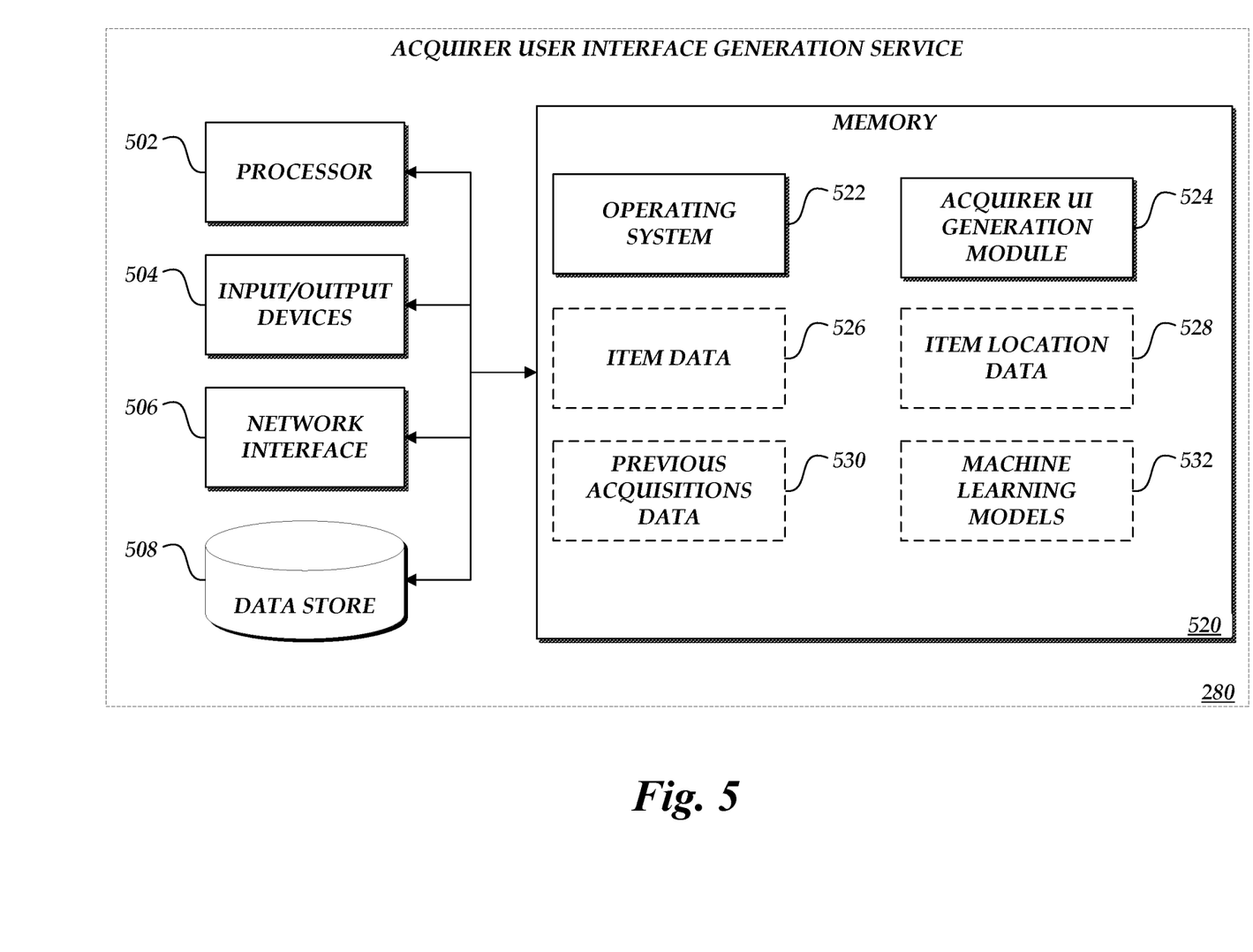
FIG. 5 is a block diagram depicting a general architecture of an example computing device for implementing an acquirer user interface generation service in accordance with aspects of the present disclosure.

FIG. 5 depicts a general architecture of the acquirer user interface generation service 280, which includes an arrangement of computer hardware and software components that may be used to implement aspects of the acquirer user interface generation service 280. The acquirer user interface generation service 280 may include many more (or fewer) elements than those shown in FIG. 5. It is not necessary, however, that all of these elements be shown in order to provide an enabling disclosure.

As illustrated, the acquirer user interface generation service 280 includes a processor 502, input/output devices 504, a network interface 506, and a data store 508, all of which may communicate with one another by way of a communication bus. The network interface 506 may provide connectivity to one or more networks (such as network 230) or computing systems and, as a result, may enable the acquirer user interface generation service 280 to receive and send information and instructions from and to other computing systems or services, such as acquirer computing devices 270 or an item order processing service 220. In some embodiments, the acquirer user interface generation service 280 may be configured to process requests from the item order processing service 220, such as requests to model acquisition of a set of items as described above.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the acquirer user interface generation service 280. The memory 520 may further store specific computer-executable instructions and other information (which may be referred to herein as "modules") for implementing aspects of the present disclosure. For example, the memory 520 may include an item acquisition modeling module 524, which may perform various operations with regard to displaying the user interfaces described herein. For example, the item acquisition modeling module 524 may perform those operations described with reference to FIG. 4.

The memory 520 may further include item data 526, item location data 528, previous acquisitions data 530, and machine learning models 532, which may be loaded into the memory 520 as various operations are performed. In some embodiments, the item data 526, item location data 528, and previous acquisitions data 530 may be obtained from external data stores (such as the item data store 240, the location data store 260, and the previous acquisitions data store 290 respectively) via the network 230. In other embodiments, one or more of the item data 526, item location data 528, and previous acquisitions data 530 may be obtained from the data store 508. In some embodiments, as described above, previous acquisitions data 530 may be omitted.

While the operating system 522 and the item acquisition modeling module 524 are illustrated as distinct modules in the memory 520, in some embodiments, the item acquisition modeling module 524 may be incorporated as a module in the operating system 522 or another application or module, and as such, separate modules may not be required to implement some embodiments.

It will be recognized that many of the components described in FIG. 5 are optional and that embodiments of the acquirer user interface generation service 280 may or may not combine components. Furthermore, components need not be distinct or discrete. Components may also be reorganized. For example, the acquirer user interface generation service 280 may be represented in a single physical device or, alternatively, may be split into multiple physical devices. In some embodiments, components illustrated as part of the acquirer user interface generation service 280 (such as the input/output devices 504) may additionally or alternatively be included in other computing devices, such that some aspects of the present disclosure may be performed by the acquirer user interface generation service 280 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
    a data store configured to store computer-executable instructions; and
    a processor in communication with the data store, wherein the processor is programmed with the computer-executable instructions to at least:
        receive a request for a time estimate indicating how long it will take to acquire a plurality of items from a distribution center, wherein the plurality of items is associated with a customer order;
        identify, for each item of the plurality of items, a location of the item within the distribution center;
        generate, from a machine learning model trained on a plurality of previous item acquisitions from the distribution center to generate ordered lists that reduce travel time between items, an ordered list of the plurality of items;
        generate, from the machine learning model, an estimated item pickup time interval for each item in the ordered list, the estimated item pickup time interval associated with a physical act of taking possession of the item;
        generate, from the machine learning model, an estimated first item travel time between a starting location of an acquirer of items and the location of a first item in the ordered list; and
        generate, from the machine learning model, an estimated subsequent item travel time for each item in the ordered list except the first item, the estimated subsequent item travel time corresponding to an estimated travel time between the location of a preceding item in the ordered list and the location of the item;
        determine, based at least in part on (i) the estimated first item travel time, (ii) the estimated subsequent item travel times, and (iii) the estimated item pickup time intervals, the time estimate to acquire the plurality of items associated with the customer order;
        generate a user interface for display, the user interface comprising an indication of elapsed time relative to an indication of the time estimate and a rate of item acquisition that corresponds to acquiring the plurality of items within the time estimate, the user interface further comprising a plurality of tick marks, wherein a distance between a first and second tick mark of the plurality of tick marks corresponds to a sum of the estimated subsequent item travel time for an item in the ordered list and the estimated item pickup time interval for the item in the ordered list;

cause display of the user interface on a computing device associated with the acquirer of items;

receive, via the user interface, information regarding acquisition by the acquirer of one or more items within the plurality of items from the distribution center;

retrain the machine learning model to form a retrained machine learning model based at least in part on the information regarding acquisition by the acquirer of the one or more items within the plurality of items;

generate, from the retrained machine learning model, an updated time estimate to acquire the remaining items of the plurality of items;

determine, based at least in part on the information received from the computing device, a probability that the plurality of items will be acquired within the updated time estimate; and in response to determining that the probability that the plurality of items will be acquired within the updated time estimate does not satisfy a threshold:
cause the display of the user interface to change to reflect that the probability that the plurality of items will be acquired within the updated time estimate does not satisfy the threshold; and
cause the user interface to display an updated rate of item acquisition that corresponds to acquiring the remaining items in the plurality of items within the updated time estimate.

2. The system of claim 1, wherein the user interface further includes an indication of estimated time to acquire the first item in the ordered list of the plurality of items, the estimated time to acquire the first item comprising a first item travel time and a first item pickup time interval.

3. The system of claim 2, wherein the user interface comprises at least a first portion and a second portion, wherein the indication of estimated time to acquire the first item is displayed as the first portion of the user interface, and wherein an indication of estimated time to acquire a second item in the ordered list is displayed as the second portion of the user interface.

4. The system of claim 3, wherein the first portion of the user interface is the same size as the second portion of the user interface, and wherein a rate of change of the indication of elapsed time varies for the first portion and the second portion.

5. The system of claim 3, wherein the first portion of the user interface is a different size than the second portion of the user interface, and wherein a rate of change of the indication of elapsed time is constant.

6. A computer-implemented method comprising:
under control of a first computing device configured with specific computer-executable instructions,
obtaining information regarding a customer order, the information regarding the customer order including a plurality of items to acquire;
generating, from a machine learning model trained on a plurality of previous item acquisitions to generate ordered lists that reduce travel time between items, an ordered list of the plurality of items;
generating, from the machine learning model, an estimated first item travel time associated with a starting location of an acquirer of items and a location of a first item in the ordered list;
generating, from the machine learning model, an estimated second item travel time for a second item in the ordered list after the first item, wherein the estimated second item travel time is associated with the location of the second item and the location of the first item in the ordered list;
generating, from the machine learning model, an estimated first item pickup time interval for the first item in the ordered list, the estimated first item pickup time interval associated with a physical act of taking possession of the first item;
generating, from the machine learning model, an estimated second item pickup time interval for the second item in the ordered list, the estimated second item pickup time interval associated with a physical act of taking possession of the second item;
determining a time estimate to acquire at least the first item and the second item, wherein the time estimate is determined based at least in part on the estimated first item travel time, the estimated second item travel time, the estimated first item pickup time interval, and the estimated second item pickup time interval;
generating a user interface for presentation, the user interface comprising an indication of elapsed time, an indication of the time estimate, and a fuse bar including a first tick mark and a second tick mark, wherein a distance between a start of the fuse bar and the first tick mark corresponds to a sum of the estimated first item travel time and the estimated first item pickup time interval, and wherein a distance between the first tick mark and the second tick mark corresponds to a sum of the estimated second item travel time and the estimated second item pickup time interval;
causing presentation of the user interface on a second computing device associated with the acquirer of items;
retraining the machine learning model to form a retrained machine learning model based at least in part on information received from the second computing device regarding acquisition of the first item;
generating, from the retrained machine learning model, an updated time estimate to acquire the remaining items of the plurality of items;
determining, based at least in part on the elapsed time and the information received from the second computing device regarding the acquisition of the first item, a probability that the second item will be acquired within the updated time estimate; and
causing the display of the user interface to change to reflect that the probability that the second item will be acquired within the updated time estimate does not satisfy a threshold.

7. The computer-implemented method of claim 6, wherein the user interface further comprises an indication of a target elapsed time.

8. The computer-implemented method of claim 7, wherein the target elapsed time is determined based at least in part on information regarding at least one of the acquirer, another acquirer, a distribution center, or at least one of the plurality of items.

9. The computer-implemented method of claim 6 further comprising:
receiving, from the second computing device, an indication that the first item has been acquired; and
causing the user interface to indicate acquisition of the first item.

10. The computer-implemented method of claim 9 further comprising:
determining that the first item was acquired in more time than was estimated; and
causing the user interface to indicate that less time remains for acquisition of the second item.

11. The computer-implemented method of claim 10, wherein
causing presentation of the user interface is responsive to determining that the first item was acquired in more time than was estimated.

12. The computer-implemented method of claim 6, wherein the user interface is presented at a bottom of a display of the second computing device.

13. The computer-implemented method of claim 12 further comprising:
causing presentation of the ordered list of the plurality of items on the second computing device.

14. The computer-implemented method of claim 13 further comprising:
receiving, from the second computing device, an indication of scrolling toward the end of the ordered list; and
causing presentation of the user interface to be hidden.

15. The computer-implemented method of claim 14 further comprising:
receiving, from the second computing device, an indication of scrolling toward the beginning of the ordered list; and
causing the presentation of the user interface to be restored.

16. A system comprising:
a data store configured to store computer-executable instructions; and
a processor in communication with the data store, wherein the processor is programmed with computer-executable instructions to at least:
obtain information regarding a plurality of items associated with a customer order;
generate, from a machine learning model trained on a plurality of previous item acquisitions to generate ordered lists that reduce travel time between items, an ordered list of the plurality of items;
generate, from the machine learning model:
an estimated first travel time associated with a first item in the ordered list;
an estimated first pickup time interval associated with the first item of the plurality of items;
an estimated second travel time associated with a second item in the ordered list;
an estimated second pickup time interval associated with the second item in the ordered list;
determine, based at least in part on the estimated first travel time, the estimated first pickup time interval, the estimated second travel time, and the estimated second pickup time interval, an estimated time to acquire at least the first item and the second item;
generate a user interface for presentation, the user interface comprising an indication of elapsed time relative to the estimated time, a first tick mark, and a second tick mark, wherein a distance between the first tick mark and a second tick mark corresponds to a sum of the estimated second travel time and the estimated second pickup time;
cause presentation of the user interface;
retrain the machine learning model based at least in part on obtained information regarding acquisition of the first item; and
cause the display of the user interface to change to reflect that a probability that the second item will be acquired within the estimated time does not satisfy a threshold, the probability determined based at least in part on an updated estimated time to acquire the second item that is generated from the retrained machine learning model.

17. The system of claim 16, wherein the ordered list of the plurality of items is generated based at least in part on categories of individual items within the plurality of items.

18. The system of claim 16, wherein the processor is programmed with further computer-executable instructions to at least:
determine, based at least in part on the retrained machine learning model, a probability that the estimated time to acquire the plurality of items will be exceeded; and
update the user interface element to include information regarding the probability that the estimated time to acquire the plurality of items will be exceeded.

19. The system of claim 1, wherein the information regarding acquisition by the acquirer of the one or more items within the plurality of items indicates that the one or more items were acquired in a different order than the ordered list generated by the machine learning model.

20. The system of claim 19, wherein the processor is programmed with further computer-executable instructions to at least determine that the different order is more efficient than the ordered list generated by the machine learning model.

21. The computer-implemented method of claim 6, wherein the first item precedes the second item in the ordered list, and wherein the information regarding the acquisition of at least the first item indicates that the first item was acquired after the second item.

22. The system of claim 16, wherein one or more items in the ordered list are acquired in a different order than the ordered list.

* * * * *